Figure 4:
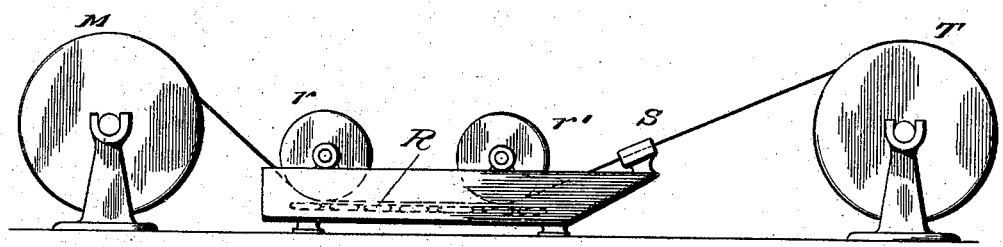

No. 709,001. Patented Sept. 16, 1902.
L. W. DOWNES.
PROCESS OF MANUFACTURING ELECTRICAL CONDUCTORS.
(Application filed Feb. 17, 1902.)
(No Model.) 2 Sheets—Sheet 1.
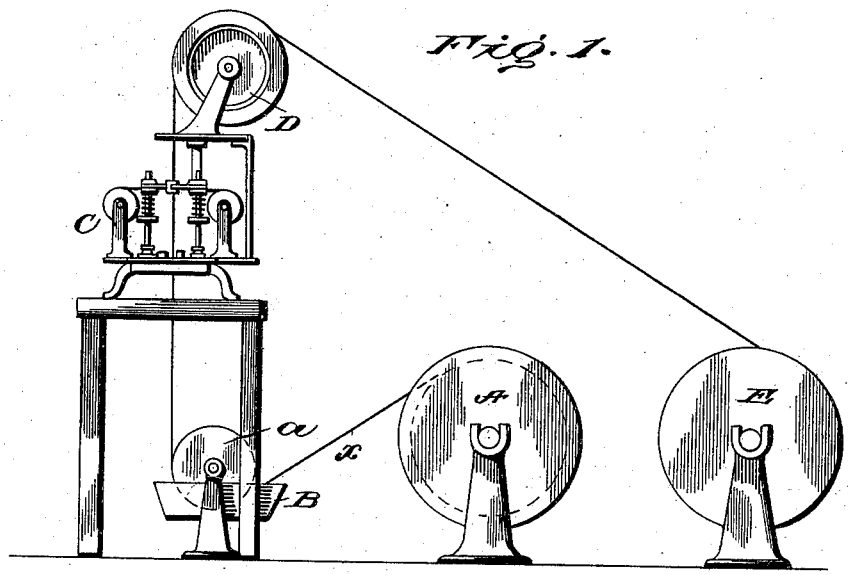
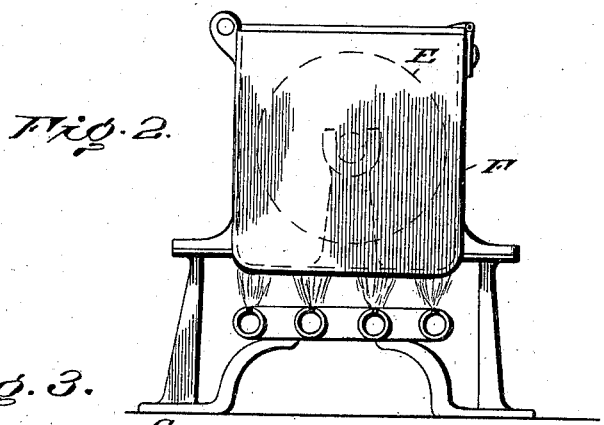
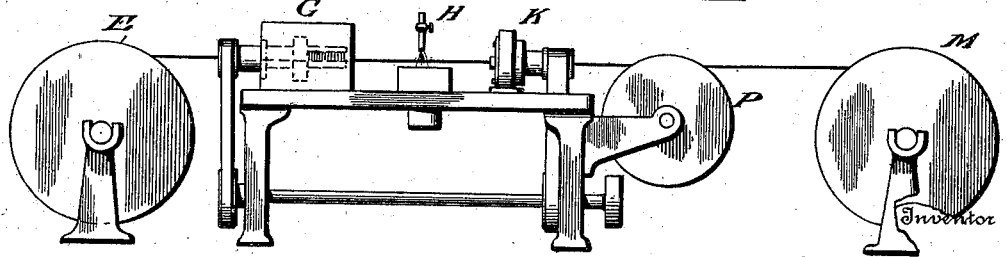

No. 709,001. Patented Sept. 16, 1902.
L. W. DOWNES.
PROCESS OF MANUFACTURING ELECTRICAL CONDUCTORS.
(Application filed Feb. 17, 1902.)

(No Model.) 2 Sheets—Sheet 2.

Witnesses Inventor
Louis W. Downes
By
Attorney

UNITED STATES PATENT OFFICE.

LOUIS W. DOWNES, OF PROVIDENCE, RHODE ISLAND.

PROCESS OF MANUFACTURING ELECTRICAL CONDUCTORS.

SPECIFICATION forming part of Letters Patent No. 709,001, dated September 16, 1902.

Application filed February 17, 1902. Serial No. 94,531. (No specimens.)

*To all whom it may concern:*

Be it known that I, LOUIS W. DOWNES, a resident of Providence, Rhode Island, have invented a new and useful Improvement in Processes of Manufacturing Electrical Conductors, which invention is fully set forth in the following specification.

The rapid introduction and use on a large scale of asbestos-insulated wire has heretofore been prevented by difficulties, first, in producing a fine yarn of this material; second, in reducing the thickness of the insulation on the wire to such an extent as to enable it to replace the cotton-insulated wire now in use. It must be understood that the spacings allowed for insulation in any electrical apparatus are of necessity limited and cannot easily exceed certain reasonable proportions. Any attempt, therefore, to replace existing insulating material would be extremely difficult unless the new insulating material employed possessed the same general dimensions as the old, as any attempt to discard existing designs and dimensions would unquestionably fail. Investigators have for many years been seeking a process by which the thickness of the insulation where asbestos was employed could be brought down to reasonable limits. While the inventions of my previous patents (Nos. 534,785, 534,786, dated February 26, 1895; No. 541,921, dated July 2, 1895, and No. 544,847, dated August 20, 1895) relating to processes and machines adapted particularly for coating metallic conductors with asbestos insulation have been quite successful in accomplishing these results, extensive experiment and investigation have disclosed difficulties which have at least tended to retard the industrial extension of the use of the asbestos-insulated conductors produced according to said inventions. These difficulties consist in the injury done occasionally to the asbestos insulation in the carding and rolling thereof, particularly in the rolling, as the rolls quite frequently become clogged and catching the asbestos yarn tear it off the wire. This necessitates stopping the machinery and a material loss of time in repairing the damaged portion of the insulation. This difficulty is largely due to the fact that the rolls in order to make contact with the periphery of the covered wire must be of extremely small diameter, it being necessary to employ three rolls bearing on the wire in practically peripheral alinement in order to hold the wire centrally and act uniformly on the asbestos covering.

After extensive experiments I have succeeded in avoiding the difficulties above referred to by my present invention, the principal feature of which consists in subjecting the asbestos insulation to pressure alternately applied and released. This pressure is preferably applied in the form of a rapid succession of blows uniformly distributed over the entire surface of the insulation and acting to beat down and compress the same against the wire, or, in other words, the asbestos insulation is swaged or subjected to a swaging operation analogous to that employed in the working of metals. The compressive force being alternately exerted and released, there is little, if any, danger of the parts of the mechanism catching and tearing off the asbestos covering. At the same time the covering is compressed, compacted, or felted together to a remarkable degree, it being thus possible to reduce the dimensions of asbestos-insulated conductors to an equality with and in some instances actually less than the dimensions of ordinary magnet-wire insulated, for example, with cotton. I am thus enabled to produce a product of practically uniform diameter throughout, greatly improving in this respect upon asbestos-insulated conductors produced heretofore.

The preferred manner of carrying out this invention can best be explained in connection with the accompanying drawings, wherein—

Figure 5:
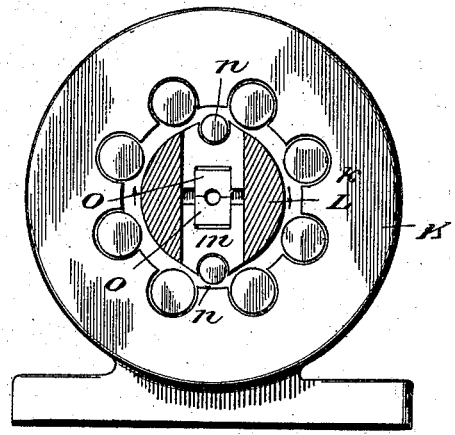

Figures 1, 2, 3, and 4 are diagrammatic views of apparatus suitable for the purpose; and Fig. 5 is a face view, partly in section, of the swaging mechanism, which is the preferred means for intermittently applying pressure to the insulating-covering and releasing the same.

Referring to Fig. 1, the wire *x* passes from reel A under pulley *a*, whereby it is carried through gum or other suitable adhesive substance in a pan B. Thence the gummed wire passes upwardly through a suitably-driven winding apparatus C, which is similar to that shown and described in my Patent No. 544,847, of August 20, 1895, except that the yarn-bobbins are disposed horizontally instead of vertically, as in the patent. Any other suitable apparatus may of course be employed for applying the asbestos to the conductor. The wire having the asbestos covering applied thereto then passes over the feed-sheave D and down to the reel E. The speed at which feed-sheave D is driven may be varied according to the speed at which it is desired to pass the wire through the winder. Reel E when full is removed from its trunnions, Fig. 1, and placed in a heating chamber or oven F, Fig. 2, where the temperature is raised sufficiently to cause the adhesive gum on the wire to melt and firmly engage and fix the asbestos to the wire. Reel E is then removed from chamber F and placed on trunnions in the position shown in Fig. 3. The dry covered wire then passes from reel E through a suitable napping or combing device G, which acts to comb or brush out the asbestos covering to remove all superfluous lumps, irregularities, &c., and lay the nap all in one direction. While any suitable device may be employed for this purpose, that preferred and illustrated is the same as shown in my Patent No. 534,785, of February 26, 1895. From the napping device the wire passes under a drip-pipe or spraying device H, whereby the asbestos covering is thoroughly moistened and brought to suitable condition for the compression thereof which follows. The conductor covered with moistened asbestos next passes to the mechanism K, Fig. 3, for compacting the insulation by the intermittent application and release of pressure. While any suitable mechanism may be employed for this purpose, that preferred is analogous to the ordinary swaging mechanism used in metal-working. Suitable mechanism for this purpose is clearly shown in Fig. 5, wherein K is an annular casing having a series of hardened-steel-metal rollers $k$ projecting from sockets around its inner edge. L is a hub rotated within casing K through its pulley, Fig. 3. $m$ $m$ are slides movable in a recess which extends laterally through hub L. At its outer end each slide carries hardened-steel roller $n$, projecting from a socket therein. At its inner end each slide carries a die $o$ $o$, having a semicircular recess in its face. As the hub L is rotated the rollers $n$ strike the rollers $k$, causing the dies in a well-known manner to impart a rapid succession of blows to the insulating-covering on the conductor, with the effect already explained. From the mechanism K, Fig. 3, the covered wire passes over a feed-sheave P, which acts to draw the wire from reel E through the napping and swaging devices. Upon leaving the sheave P the wire is wound on reel M. After allowing the covered wire thereon to thoroughly dry out the reel M is placed on trunnions, as shown in Fig. 4, and the covered wire passed therefrom under pulleys $r$ $r'$ through a suitable finishing solution—such as japan, for example—in a tank R. A steam-coil or other heating means is employed to keep the solution in a heated state, so that it will thoroughly penetrate the insulating-covering on the wire. Upon emerging from the solution in the tank the covered wire passes through a wiper S, which removes superfluous finishing solution taken up by the wire. The wire is finally wound on a reel T. It may then be dried by artificial heat and is ready for the market.

While I have described above the preferred manner and mechanism for carrying out my invention, it may of course be practiced in many other ways. The insulating-covering may be applied to the conductor in any suitable form and manner and the rapid intermittent application and release of pressure effected by any suitable means. It may be found desirable in some cases to entirely omit one or more of the steps—as, for example, the napping. Furthermore, while the process is particularly adapted to the production of conductors insulated with asbestos it may also be used to advantage in making conductors insulated with other materials. It is therefore apparent that modifications may be made within wide limits without departing from the nature and principle of the invention.

What I claim is—

1. The herein-described process of producing insulated electrical conductors consisting in covering the conductor with a suitable insulating material and subjecting the insulation to pressure alternately applied and released, thereby compacting the insulation on the conductor.

2. The herein-described process of producing insulated electrical conductors consisting in covering the conductor with a suitable insulating material and subjecting the insulation to pressure alternately applied and released in rapid succession, thereby compacting the insulation on the conductor.

3. The herein-described process of producing insulated electrical conductors consisting in covering the conductor with a suitable insulating material and subjecting the insulation to pressure alternately applied and released in rapid succession, the application of the pressure being equally distributed over the entire surface of the insulation, thereby uniformly compacting the insulation on the conductor.

4. The process of producing electrical conductors consisting in covering a conductor with a suitable insulating material, and subjecting the covered conductor to a rapid succession of blows uniformly distributed over its surface.

5. The process of producing electrical conductors consisting in covering a conductor with a suitable insulating material, and swaging the covered conductor thereby compacting the insulation.

6. The process of producing insulated electrical conductors consisting in applying an adhesive substance to a conductor, covering the conductor with a suitable insulating material, and subjecting the covered conductor to pressure alternately applied and released in rapid succession, thereby compacting the insulation on the conductor.

7. The process of producing insulated electrical conductors consisting in applying an adhesive substance to a conductor, covering the conductor with a suitable insulating material, heating the covered conductor to a temperature sufficient to melt the adhesive substance and subjecting the covered conductor to pressure alternately applied and released in rapid succession thereby compacting the insulation on the conductor.

8. The process of producing insulated electrical conductors consisting in applying an adhesive substance to a conductor, covering the conductor with a suitable insulating material, napping the insulating-covering to remove irregularities and lay the nap all in one direction and subjecting the covered conductor to pressure alternately applied and released in rapid succession thereby compacting the insulation on the conductor.

9. The process of producing insulated electrical conductors consisting in covering the conductor with a suitable insulating material, moistening the insulation and subjecting the covered conductor to pressure alternately applied and released in rapid succession, thereby compacting the insulation on the conductor.

10. The process of producing insulated electrical conductors consisting in applying an adhesive substance to a conductor, covering the conductor with a suitable insulating material, heating the covered conductor to a temperature sufficient to melt the adhesive substance, napping the insulating-covering to remove irregularities and lay the nap all in the same direction, moistening the insulating-covering and subjecting the covered conductor to pressure alternately applied and released in rapid succession thereby compacting the insulation on the conductor.

In testimony whereof I have signed this specification in the presence of two subscribing witnesses.

LOUIS W. DOWNES.

Witnesses:
JAMES H. THURSTON,
EDWIN P. ALLEN.